(12) United States Patent
Frenkenberger et al.

(10) Patent No.: US 8,545,620 B2
(45) Date of Patent: Oct. 1, 2013

(54) CEMENT ACCELERATOR

(75) Inventors: Karl Frenkenberger, Oberottmarshausen (DE); Stefan Köhler, Neusäß Steppach (DE); Thomas Heichele, Bobingen (DE); Klaus-Dieter Hötzl, Augsburg (DE); Patrick Weiss, Augsburg (DE); Alexander Dressen, Augsburg (DE)

(73) Assignee: Construction Research & Technology GmbH, Trostberg (DE)

( * ) Notice: Subject to any disclaimer, the term of this patent is extended or adjusted under 35 U.S.C. 154(b) by 0 days.

(21) Appl. No.: 13/580,683

(22) PCT Filed: Mar. 7, 2011

(86) PCT No.: PCT/EP2011/053349
§ 371 (c)(1),
(2), (4) Date: Sep. 21, 2012

(87) PCT Pub. No.: WO2011/110509
PCT Pub. Date: Sep. 15, 2011

(65) Prior Publication Data
US 2013/0118381 A1    May 16, 2013

(30) Foreign Application Priority Data
Mar. 9, 2010 (EP) .................... 10155940

(51) Int. Cl.
C04B 28/06 (2006.01)
C04B 24/32 (2006.01)
C04B 28/16 (2006.01)

(52) U.S. Cl.
USPC ........................................ 106/695

(58) Field of Classification Search
USPC ........................................ 106/695
See application file for complete search history.

(56) References Cited

U.S. PATENT DOCUMENTS

| 5,360,841 A | 11/1994 | Knop et al. |
| 5,413,634 A | 5/1995 | Shawl et al. |
| 5,609,680 A * | 3/1997 | Kobayashi et al. ........... 106/696 |
| 7,258,736 B2 | 8/2007 | Oriakhi et al. |
| 2004/0261664 A1 | 12/2004 | Oriakhi et al. |
| 2008/0319217 A1 | 12/2008 | Ingrisch et al. |
| 2011/0160393 A1 | 6/2011 | Sakamoto et al. |

FOREIGN PATENT DOCUMENTS

| CA | 2071051 | 12/1992 |
| DE | 35 27 981 A1 | 2/1987 |
| DE | 43 42 407 A1 | 6/1995 |
| DE | 197 24 700 A1 | 12/1998 |
| DE | 10 2005 001 101 A1 | 7/2006 |
| DE | 20 2006 016 797 U1 | 2/2007 |
| DE | 10 2005 051 375 A1 | 5/2007 |
| EP | 0 403 974 A1 | 12/1990 |
| EP | 0 518 156 A2 | 12/1992 |
| EP | 0 637 574 A1 | 2/1995 |
| EP | 1 491 516 A2 | 12/2004 |
| EP | 2 325 231 A1 | 5/2011 |
| JP | 2008127247 A * | 6/2008 |

OTHER PUBLICATIONS

PCT/EP2011/063349—International Search Report, Jul. 29, 2011.
PCT/EP2011/053349—International Written Opinion, Jul. 29, 2011.
PCT/EP2011/053349—International Preliminary Report on Patentability, Sep. 25, 2012.

* cited by examiner

Primary Examiner — Anthony J Green
(74) Attorney, Agent, or Firm — Curatolo Sidoti Co., LPA; Joseph G. Curatolo; Salvatore A. Sidoti

(57) ABSTRACT

The invention relates to an inorganic binder system comprising a) calcium silicate cement, b) calcium aluminate cement, c) at least one trifunctional polyalkylene glycol and d) optionally calcium sulphate. Additionally disclosed is the use of at least one polyalkylene glycol as an accelerator for an inorganic binder system comprising a) calcium silicate cement, b) calcium aluminate cement and d) optionally calcium sulphate.

15 Claims, No Drawings

CEMENT ACCELERATOR

CROSS REFERENCE TO RELATED APPLICATIONS

This application is a national stage application of International Application No. PCT/EP2011/053349, filed 7 Mar. 2011, which claims priority from European Patent Application No. 10155940.9, filed 9 Mar. 2010, from which applications priority is claimed, and which are incorporated herein by reference.

The present invention relates to an inorganic binder system comprising a) calcium silicate cement, b) calcium aluminate cement and c) at least one trifunctional polyalkylene glycol, and to the use of at least one polyalkylene glycol as an accelerator for such a cementious system.

Solidification accelerators are used especially when inorganic binder systems are to be used at low temperatures close to the frost line. The hydration rate, for example of Portland cement, is very temperature-dependent and is significantly reduced at relatively low temperatures. If a satisfactory development of strength of, for example, concrete or mortar is required at these temperatures, measures have to be taken to accelerate hydration. Possibilities for this purpose consist in increasing the cement content, heating the concrete or mortar or using chemical substances to accelerate solidification. Different solidification accelerators are commonly known. These include alkali metal hydroxides, silicates, fluorosilicates, calcium formate, sodium chloride, calcium chloride, and calcium nitrate and nitrite.

A further means of achieving rapid development of strength is the use of a binder mixture comprising calcium silicate cement and calcium aluminate cement, which may especially be Portland cement (PC) and alumina cement (AC). Such binder systems are used especially when rapid construction progress and, associated with this, rapid hardening is to be achieved. Binder mixtures comprising calcium silicate cement, calcium aluminate cement and additionally calcium sulphate additionally exhibit rapid drying and hence low residual moisture contents and good dimensional stability; however, the water resistance is lowered significantly. This binder is therefore preferentially suitable for fast-hardening building materials which are intended for the interior sector. The rapid reaction with water leads within a short time to a low water content of the products produced, which are relatively dimensionally stable. For example, in the case of use as a screed material or spackling paste, rapid readiness for overlaying can be achieved, since the screed thus produced or the spackling paste can, even after a short time, be walked upon and ground and, owing to the low residual moisture content and high strength, also be overlaid with a surface material such as textile overlays, plastic overlays or else tiles and slabs.

Such systems are generally present in the form of dry mix mortars. These are ready-to-use pulverulent mortar mixtures which are mixed on site, i.e. shortly before application on the construction site, with water to give mortar. Dry mix mortars consist of binders, fillers and further constituents, for example setting regulators, rheological additives, water retention aids and levelling agents. Such dry mix mortars are generally mixed in large mixing plants and subsequently preferably dispensed into paper sacks and stored therein until use.

For example, DE 35 27 981 discloses a mixture for producing fast-hardening mortars and renders, which comprise, as essential binder constituents, reactive calcium silicates, reactive aluminates, calcium hydroxide and calcium sulphate hemihydrate/calcium sulphate anhydrite II.

DE 10 2005 001 101 discloses a dry mixture which comprises Portland limestone cement, aluminate cement and calcium sulphate in combination with iron sulphate and/or aluminium sulphate.

In addition, DE 43 42 407 claims a hydraulic binder comprising a mixture of iron-containing alumina cement, calcium sulphate and Portland cement in a particular mixing ratio to one another.

DE 197 24 700 relates to a spackling paste based on a hydraulic binder, characterized in that, inter alia, it comprises 0.1 to 6% by weight of white cement, 0.1 to 3% by weight of lime hydrate, 5 to 45% by weight of alumina cement and 2 to 18% by weight of calcium sulphate.

These binder blends exhibit very rapid setting behaviour. To control the setting behaviour, retardants and accelerators can also be added to these systems. The retardants serve to adjust the processing time or pot life; the accelerators are added to increase the development of strength after the end of the pot life.

A problem which continues to be associated with these systems based on calcium silicate cement and calcium aluminate cement and optionally calcium sulphate is the achievement of a very substantially homogeneous pot life and development of strength both at high temperatures, especially between 20 and 30° C., and at low temperatures, especially between 15 and 5° C. As a guide value for such fast-setting ready-to-use mortars, the pot life for good processibility should be between 15 and 90 minutes. When the pot life for such systems according to the prior art is acceptable at low temperatures, for example at 5° C., and the development of strength is sufficiently rapid, the pot life becomes too short at higher temperatures, for example at 30° C.

It was therefore an object of the present invention to provide an inorganic binder system comprising calcium silicate cement, calcium aluminate cement and optionally calcium sulphate, which possesses optimal solidification and development of strength at low temperatures, especially between 5 and 15° C., and at the same time still has a sufficiently long processing time at high temperatures, especially between 20 and 30° C.

It was a further object of this invention to provide a dry mix mortar comprising calcium silicate cement, calcium aluminate cement and optionally calcium sulphate, which has a virtually homogeneous pot life and development of strength in the course of processing both at room temperature and at low temperatures, especially below 10° C.

This object is achieved by an inorganic binder system comprising a) calcium silicate cement, b) calcium aluminate cement, c) at least one trifunctional polyalkylene glycol and optionally d) calcium sulphate.

It has been found that, surprisingly, polyalkylene glycols act as accelerators at low temperatures in systems comprising calcium silicate cement, calcium aluminate cement and optionally calcium sulphate. It was particularly surprising in this context that the processing time of such a system at high temperatures is altered only insignificantly by the addition of the inventive accelerator.

The calcium silicate cement of component a) is especially Portland cement. In addition, it is also possible to use latently hydraulic binders, for example pozzolans, such as metakaolin, calcium metasilicate and/or volcanic slag, volcanic tuff, fly ash, blast furnace slag, trass and/or microsilicate, optionally together with a calcium source, such as calcium hydroxide and/or cement. As far as the calcium silicate cement is concerned, the amount in the inventive system can be varied within wide ranges. In general, the amount of calcium silicate cement is in the range from 10 to 30% by weight, especially 10 to 25% by weight, preferably 10 to 20% by weight, based on the inventive system. It may nevertheless be necessary depending on the individual case or for application reasons to deviate from the aforementioned amounts.

The calcium aluminate cement of component b) is especially alumina cement or high-alumina cement. As far as the calcium aluminate cement is concerned, the amount in the inventive system can be varied within wide ranges. In general, the amount of calcium aluminate cement is in the range from 1 to 10% by weight, especially 1 to 8% by weight, preferably 1 to 4% by weight, based on the inventive system. Nevertheless, it may be necessary depending on the individual case or for application reasons to deviate from the aforementioned amounts. Particularly good results are obtained when a calcium aluminate cement with a Blaine specific surface area of 2000 to 4000 cm$^2$/g, especially 2500 to 3750 cm$^2$/g, preferably 2750 to 3500 cm$^2$/g, is used.

In contrast to calcium silicate cement, calcium aluminate cement does not release any lime in the course of hydration; these properties and its low porosity give good chemical resistance to construction chemical formulations such as spackling pastes, screed materials or floor levelling compounds, and avoids efflorescence. More particularly, the calcium aluminate cement used acts in the inventive system, inter alia, as a setting and hardening accelerator, so as to result in a mixture which is notable for high rapidity of hydration at a temperature between 20 and 30° C. A calcium aluminate cement used with preference in accordance with the invention has, based in each case on the calcium aluminate cement and determined in each case to DIN EN 196-2:1994, 35 to 41% by weight of CaO, 1 to 6% by weight of SO$_2$, 35 to 45% by weight of Al$_2$O$_3$ and 12 to 19% by weight of Fe$_2$O$_3$.

More particularly, the trifunctional polyalkylene glycol is polyethylene glycol, polypropylene glycol and/or polytetramethylene glycol, preferably based on trimethylolpropane or glycerol. In general, the amount of trifunctional polyalkylene glycol is in the range from 0.05 to 5% by weight, especially 0.1 to 2% by weight, preferably 0.5 to 1.5% by weight, based on the inventive system. Nevertheless, it may be necessary depending on the individual case or for application reasons to deviate from the aforementioned amounts.

The calcium sulphate component d) optionally present is preferably in hydrated form, especially in the form of calcium sulphate hemihydrate or anhydrite. The amount of calcium sulphate used in the inventive system can also be varied within wide ranges. In general, the amount of calcium sulphate is in the range from 0 to 20% by weight, especially 2 to 15% by weight, preferably 3 to 8% by weight, based on the inventive system. Particularly good results are obtained when a calcium sulphate with a Blaine specific surface area of 2500 to 3500 cm$^2$/g, preferably 2750 to 3250 cm$^2$/g, more preferably of about 3000 cm$^2$/g, is used. The calcium sulphate used should have a calcium sulphate content of at least 90% by weight. A calcium sulphate preferred in accordance with the invention has a true density of 2.5 to 3.0 g/cm$^3$, especially 2.7 to 2.9 g/cm$^3$, and a bulk density of 800 to 1200 g/l, especially 850 to 1150 g/l, preferably 900 to 1100 g/l.

More particularly, the inventive inorganic binder system comprises a) Portland cement, b) alumina cement, c) at least one trifunctional polyalkylene glycol and d) anhydrite. The system more preferably has the following composition: a) 10 to 30% by weight of Portland cement, b) 1 to 10% by weight of alumina cement, c) 0.05 to 5% by weight of at least one trifunctional polyalkylene glycol based on trimethylolpropane or glycerol and polyethylene glycol, polypropylene glycol and/or polytetramethylene glycol and d) 0 to 20% by weight, especially 2 to 18% by weight, of anhydrite.

To control the setting time, it is possible to add, as further accelerators or retardants, especially hydroxides, inorganic and/or organic acids and/or salts thereof, and alkali metal carbonates, or mixtures of these compounds. In particular, the further accelerators or retardants added are calcium hydroxide, citric acid and/or salts thereof, lithium carbonate, sodium carbonate and/or potassium carbonate, or mixtures of these compounds. The amount of setting regulator may vary within wide ranges. In general, the setting regulator is used in amounts of 0.001 to 4% by weight, especially 0.01 to 0.25% by weight, based on the inorganic binder system. Nevertheless, it may be necessary in some cases to deviate from the aforementioned values.

More particularly, the inventive inorganic binder system may further comprise 20 to 60% by weight of quartz sand, 0.1 to 2% by weight of a further cement accelerator, especially alkali metal and/or alkaline earth metal hydroxide, preferably calcium hydroxide, and alkali metal and/or alkaline earth metal carbonate, especially lithium carbonate, and 0.1 to 2% by weight of cement retardants, especially polyhydroxycarboxylic acids and other polyhydroxyl compounds.

The proportion of fillers in the inventive inorganic binder system is preferably 10 to 85% by weight. The fillers used are especially quartz sand, quartz flour, limestone, heavy spar, calcite, dolomite, talc, kaolin, mica and chalk. The lightweight fillers used may be perlite, mineral foam, foam beads, pumice, expanded glass, hollow glass beads and calcium silicate hydrate. It is of course also possible to use mixtures of the fillers.

In addition, the inorganic binder system may comprise limestone flour as a filler, especially in amounts of 5 to 40% by weight, preferably 20 to 35% by weight, more preferably 25 to 35% by weight, based on the inorganic binder system. Limestone flour preferred in accordance with the invention comprises at least 90% by weight, preferably at least 95% by weight, of calcium carbonate, based on the limestone flour. Particularly good results are obtained with a limestone flour with a bulk density of 800 to 1000 g/l, especially 900 to 950 g/l. Limestone flour preferred in the context of the present invention has a Blaine specific surface area of 3500 to 4500 cm$^2$/g, preferably 3750 to 4250 cm$^2$/g, more preferably of about 4000 cm$^2$/g.

The system preferably comprises quartz sand as a filler, especially in amounts of 15 to 85% by weight, preferably 25 to 65% by weight, more preferably 35 to 60% by weight, based on the inorganic binder system. In a particular embodiment of the present invention, a mixture of quartz sands of different particle sizes and different Blaine specific surface areas is used. More particularly, a comparatively fine quartz sand is combined with a comparatively coarse quartz sand. Quartz sand preferred in accordance with the invention has an SiO$_2$ content of more than 95% by weight, preferably of more than 98% by weight, based on the quartz sand. Quartz sand preferred in accordance with the invention has a (Blaine) theoretical specific surface area of at least 60 cm$^2$/g, preferably at least 70 cm$^2$/g, more preferably at least 80 cm$^2$/g.

In addition, the inorganic binder system may also comprise at least one latently hydraulic solid component such as kaolin, metakaolin, slag, fly ash, microsilica, activated clay (pozzolan), silicon oxides, aluminium oxides. These are optionally used in amounts of 1 to 15% by weight, preferably 1 to 5% by weight, based on the inorganic binder system.

The inorganic binder system may additionally comprise further constituents and/or additives to optimize the performance properties. Such constituents or additives may, for example, be selected from the group of plasticizers, redispersible polymer powders, defoamers, stabilizers, water retention aids, thickeners, levelling agents, dedusting agents and pigments.

For example, the inventive inorganic binder system may comprise at least one plasticizer, especially in amounts of 0.01 to 5% by weight, preferably 0.05 to 2% by weight, more preferably 0.1 to 0.5% by weight, based on the inorganic binder system. Examples of preferred plasticizers are plasticizers based on lignosulphonates, casein, sulphonated naphthalene-formaldehyde condensates, sulphonated melamine-formaldehyde condensates and modified polycarboxylate ethers. More particularly, the plasticizers are selected such that they reduce the water required in the mixing process, and additionally advantageously also lead to or promote development of particularly good early strength.

In addition, the inventive inorganic binder system may comprise, to optimize the performance properties, an additive which improves or influences the rheological and/or physical properties. This may, for example, be on the basis of a water-redispersible polymer powder, preferably on the basis of vinyl acetate and ethylene (ethylene/vinyl acetate copolymer). Such an additive can be used especially in amounts of 1 to 15% by weight, preferably 1 to 5% by weight, based on the inorganic binder system.

The inventive system may comprise at least one defoamer, for example a combination of liquid hydrocarbons and amorphous silica. Such a defoamer can be used especially in amounts of 0.001 to 3% by weight, preferably 0.05 to 1% by weight, based on the overall system.

In addition, the inorganic binder system may comprise at least one stabilizer. Such stabilizers may, for example, be selected from gums (e.g. diutan gum) or else be based on cellulose or cellulose derivatives (e.g. hydroxyethylcellulose). It is also possible to combine different stabilizers with one another, for example gums on the one hand and cellulose or cellulose derivatives on the other hand. When the stabilizers used are gums, they can be used in amounts of 0.001 to 0.2% by weight, preferably 0.03 to 0.08% by weight, based on the inorganic binder system. When the stabilizers used are cellulose or cellulose derivatives (e.g. hydroxyethylcellulose), they can be used in amounts of 0.001 to 0.5% by weight, preferably 0.05 to 0.15% by weight, based on the overall system.

Moreover, the inventive inorganic system may comprise at least one additive to adjust the water-retaining capacity. As a water retention aid, methylcellulose in particular may be present in the mixture in an amount of 0.5 to 2% by weight, preferably 0.8 to 1.5% by weight.

Finally, in a preferred embodiment, thickeners are also present, which are preferably selected from the group of swellable sheet silicates (e.g. bentonites, attapulgites, kaolinites) and polyacrylates or combinations thereof, and are preferably used in an amount of 0.5 to 2% by weight, based on the inorganic binder system.

In addition, pigments can also be added to the inventive inorganic binder system, especially from the group of the iron oxides.

The inventive inorganic binder system is preferably a dry mix mortar. Dry mix mortars tend to form significant dust particularly in transferring and mixing processes. In a preferred embodiment, a dedusting agent can therefore be added to the inventive dry mix mortar, which is preferably an aliphatic hydrocarbon. With regard to the preferred dedusting agents, reference is also made to DE 20 2006016797, which is hereby incorporated into the application.

The inventive inorganic binder system preferably comprises between 30 and 60% by weight of filler, between 10 and 30% by weight of calcium silicate cement, between 1 and 10% by weight of calcium aluminate cement, between 0.05 and 5% by weight of at least one trifunctional polyalkylene glycol and optionally between 0.005 and 1% by weight of at least one further accelerator and/or retardant, and between 0 and 20% by weight of calcium sulphate.

In a preferred embodiment, the inorganic binder system is used as a spackling paste, screed material or levelling compound.

The present invention further provides for the use of at least one polyalkylene glycol as an accelerator for a cementious system which comprises the components a) calcium silicate cement, b) calcium aluminate cement and optionally c) calcium sulphate.

The polyalkylene glycol may especially be polyethylene glycol, polypropylene glycol and/or polytetramethylene glycol, more preferably polyethylene glycol. The polyalkylene glycols comprise preferably between two and 10, more preferably three, hydroxyl groups, and have a weight-average molecular weight between 32 and 20 000, more preferably between 40 and 2000 and especially between 100 and 800 g/mol. The polyalkylene glycol is preferably at least one trifunctional polyalkylene glycol, especially polyethylene glycol, polypropylene glycol and/or polytetramethylene glycol, more preferably polyethylene glycol, and especially based on trimethylolpropane or glycerol. The mean molar mass of the trifunctional polyalkylene glycols is preferably 200 to 800 g/mol. Suitable polyalkylene glycols are preferably the room temperature liquid compounds.

In addition, the present invention provides a process in which the inventive inorganic binder system is processed at a temperature between 5 and 30° C.

Overall, the present invention provides an inorganic binder system based on calcium silicate cement, calcium aluminate cement and optionally calcium sulphate, which is notable for a homogeneous pot life and development of strength, both at high temperatures, especially between 20 and 30° C., and at low temperatures, especially between 15 and 5° C.

The examples which follow illustrate the advantages of the present invention.

EXAMPLES

Spackling Paste 1:

| | |
|---|---|
| 0.1 to 1.2 mm quartz sand | 71.8% by wt. |
| Lightweight filler | 2.0% by wt. |
| CEM II 52.5 Portland cement | 20% by wt. |
| Alumina cement | 2.0% by wt. |
| Dispersion powder | 1.0% by wt. |
| Accelerator | 3.0% by wt. |
| Retardant | 0.2% by wt. |
| Amount of mixing water: | 220 g/kg of powder |

Spackling Paste 2:

| | |
|---|---|
| 0.1 to 1.2 mm quartz sand | 71.6% by wt. |
| Lightweight filler | 2.0% by wt. |
| CEM II 52.5 Portland cement | 17% by wt. |
| Alumina cement | 2.0% by wt. |
| Anhydrite | 3.0% by wt. |
| Dispersion powder | 1.0% by wt. |

-continued

| | |
|---|---|
| Accelerator | 3.0% by wt. |
| Retardant | 0.2% by wt. |
| Amount of mixing water: | 220 g/kg of powder |

Spackling Paste 3:

| | |
|---|---|
| 0.1 to 1.2 mm quartz sand | 69.3% by wt. |
| CEM II 52.5 Portland cement | 20% by wt. |
| Alumina cement | 3.0% by wt. |
| Anhydrite | 3.0% by wt. |
| Microsilica | 2.5% by wt. |
| Dispersion powder | 1.0% by wt. |
| Accelerator | 1.0% by wt. |
| Retardant | 0.2% by wt. |
| Amount of mixing water: | 180 g/kg of powder |

Mixing:

The particular spackling paste is mixed up until free of lumps with the stated amount of mixing water, with or without Pluriol A4TE (Pluriol A4TE from BASF SE is a trifunctional polyethylene glycol based on glycerol, which has three hydroxyl groups per molecule), with the aid of a drill and an M17 disc stirrer. After a maturing time of 3 min., the mortar is mixed briefly once again by hand with a ladle, and the tests are commenced.

Processing Time:

After mixing with the stated amount of water, the levelling of the spackling paste is tested subjectively every 5 min. For this purpose, the mixed mortar is introduced into a vessel; layer height approx. 4 cm. The end of the processing time has been attained when the spackling paste, after having a trowel pulled through it, no longer merges to form a homogeneous surface and a dividing line remains visible.

Start/End of Solidification:

The solidification time of the mortar mixed up in each case is determined by the Vicat method to DIN EN 196 part 3.

Overlaying Readiness:

The mortar made up is applied in a layer thickness of 2 cm to a nonabsorptive substrate. After 24 min, a pencil eraser is used to subject the surface to moderate manual pressure and subject it to a rotation of 360°. Overlaying readiness has been attained when no mortar flaking or abrasion arises any longer.

Results:

Spackling Paste 1

| Without poly-alkylene glycol | Processing time | Start of solidification | End of solidification | Overlaying readiness |
|---|---|---|---|---|
| 23° C. | 30 min | 35 min | 55 min | 90 min |
| 10° C. | 100 min | 110 min | 160 min | 240 min |

| With 1% by weight of polyalkylene glycol (Pluriol A4TE) | Pot life | Start of solidification | End of solidification | Overlaying readiness |
|---|---|---|---|---|
| 23° C. | 30 min | 35 min | 55 min | 90 min |
| 10° C. | 50 min | 60 min | 100 min | 140 min |

Spackling Paste 2

| Without poly-alkylene glycol | Processing time | Start of solidification | End of solidification | Overlaying readiness |
|---|---|---|---|---|
| 23° C. | 30 min | 35 min | 55 min | 70 min |
| 10° C. | 80 min | 115 min | 185 min | 255 min |

| With 1% by weight of polyalkylene glycol (Pluriol A4TE) | Processing time | Start of solidification | End of solidification | Overlaying readiness |
|---|---|---|---|---|
| 23° C. | 30 min | 35 min | 55 min | 70 min |
| 10° C. | 30 min | 40 min | 80 min | 180 min |

Spackling Paste 3

| Without poly-alkylene glycol | Processing time | Start of solidification | End of solidification | Overlaying readiness |
|---|---|---|---|---|
| 23° C. | 30 min | 35 min | 55 min | 70 min |
| 5° C. | 80 min | 115 min | 185 min | 240 min |

| With 1% by weight of polyalkylene glycol (Pluriol A4TE) | Pot life | Start of solidification | End of solidification | Overlaying readiness |
|---|---|---|---|---|
| 23° C. | 30 min | 35 min | 55 min | 90 min |
| 5° C. | 60 min | 70 min | 100 min | 140 min |

The invention claimed is:

1. Inorganic binder system comprising
   a) calcium silicate cement
   b) calcium aluminate cement
   c) at least one trifunctional polyalkylene glycol, which trifunctional polyalkylene glycol has three hydroxyl groups per molecule, and
   d) optionally calcium sulphate.

2. Inorganic binder system according to claim 1 comprising
   a) Portland cement
   b) alumina cement
   c) at least one trifunctional polyalkylene glycol, which trifunctional polyalkylene glycol has three hydroxyl groups per molecule, and
   d) optionally anhydrite.

3. Inorganic binder system according to claim 1 comprising
   a) 10 to 30% by weight of Portland cement
   b) 1 to 10% by weight of alumina cement
   c) 0.05 to 5% by weight of at least one trifunctional polyalkylene glycol based on trimethylolpropane or glycerol, wherein said at least one trifunctional polyalkylene glycol has three hydroxyl groups per molecule and comprises polyethylene glycol, polypropylene glycol and/or polytetramethyleneglycol, and
   d) 0 to 20% by weight of anhydrite.

4. Inorganic binder system according to any of claim 1, further comprising
20 to 60% by weight of quartz sand
0.1 to 4% by weight of a further cement accelerator, and
0.1 to 2% by weight of cement retardant.

5. Inorganic binder system according to claim 1, wherein the inorganic binder system is a dry mix mortar.

6. Inorganic binder system according to claim 1, comprising at least one further additive, wherein the further additive is at least one of plasticizers, redispersible polymer powders, defoamers, stabilizers, water retention aids, thickeners, dedusting agents, accelerators, retardants or pigments is present.

7. Inorganic binder system according to claim 6, wherein the further accelerators or retardants used are hydroxides, inorganic and/or organic acids and/or salts thereof, and/or alkali metal carbonates, or mixtures of these compounds.

8. Inorganic binder system according to claim 6, wherein the further accelerators or retardants used are calcium hydroxide, citric acid and/or salts thereof, lithium carbonate, sodium carbonate and/or potassium carbonate, or mixtures of these compounds.

9. Inorganic binder system according to claim 1, wherein the inorganic binder system comprises, as a filler, at least one compound from the group of quartz sand, quartz flour, limestone, heavy spar, calcite, dolomite, talc, kaolin, mica and/or chalk.

10. Inorganic binder system according to claim 1, wherein the inorganic binder system comprises between 30 and 60% by weight of filler, between 10 and 30% by weight of calcium silicate cement, between 1 and 10% by weight of calcium aluminate cement, between 0.05 and 5% by weight of at least one trifunctional polyalkylene glycol, which trifunctional polyalkylene glycol has three hydroxyl groups per molecule, and optionally between 0.005 and 1% by weight of at least one further accelerator and/or retardant and between 0 and 20% by weight of calcium sulphate.

11. Inorganic binder system according to claim 1, wherein the inorganic binder system comprises between 1 and 15% by weight of a latently hydraulic solid component.

12. A spackling paste, screed material or levelling compound, comprising the inorganic binder system according to claim 1.

13. A process comprising utilizing at least one trifunctional polyalkylene glycol, which trifunctional polyalkylene glycol has three hydroxyl groups per molecule, as an accelerator for a cementitious system, which comprises the components
   a) calcium silicate cement and
   b) calcium aluminate cement and optionally
   d) calcium sulphate.

14. The process according to claim 13, wherein the polyalkylene glycol is polyethylene glycol, polypropylene glycol and/or polytetramethylene glycol.

15. A process comprising solidifying and developing strength of the inorganic binder system according to claim 1 at a temperature between 5 and 15° C.

* * * * *